March 15, 1966     T. L. WADLEY     3,241,139
DISTANCE MEASURING SYSTEM
Filed April 20, 1964
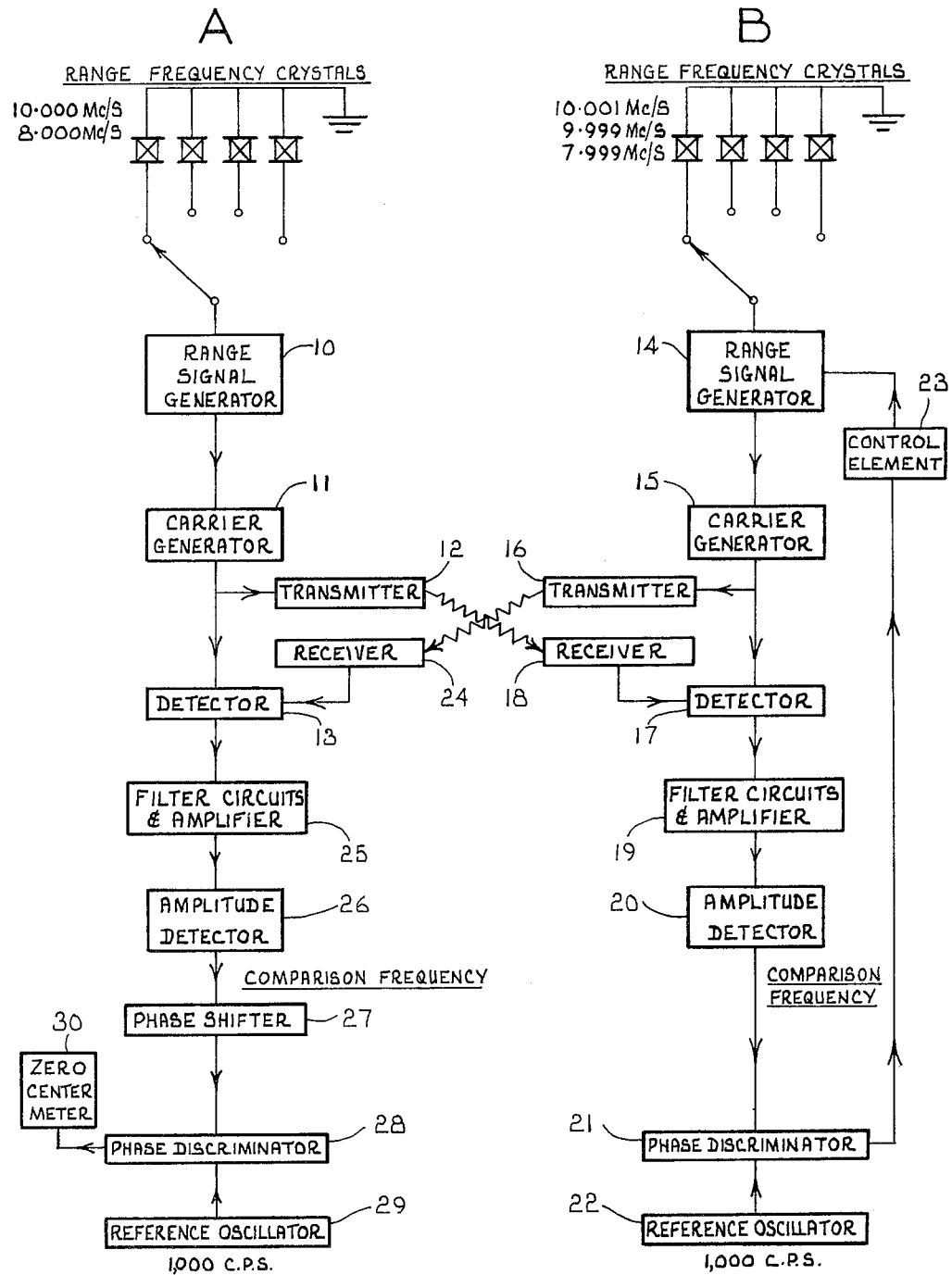
INVENTOR
TREVOR LLOYD WADLEY
By Irwin & Thompson
ATTY.

United States Patent Office 3,241,139
Patented Mar. 15, 1966

3,241,139
DISTANCE MEASURING SYSTEM
Trevor L. Wadley, % Telecommunication Research Laboratory, University of the Witwatersrand, Milner Park, Johannesburg, Transvaal, Republic of South Africa
Filed Apr. 20, 1964, Ser. No. 360,864
8 Claims. (Cl. 343—12)

This invention relates to systems for measuring distances by means of radiated waves. More particularly it relates to systems for measuring the distance between a master and a remote station in which a comparison signal is derived at each station from two range signals and the comparison signal at the remote station is returned to the master station for comparison with the comparison signal existing at the master station. Such a system is described in the specification of United States Patent No. 2,907,999.

It is an object of the present invention to provide a new method of and a system for measuring distances by means of radiated waves in which the comparison signal derived at the remote station is not returned to the master station.

It is another object of the present invention to provide a system for measuring distances by means of radiated waves which is simpler and cheaper than conventional systems.

According to the invention a method of providing a relative measure of the distance between two points includes the steps of transmitting a signal of a first range frequency of a high order from the first point; transmitting a signal of a second range frequency of a similar high order from the second point; at the second point deriving a first comparison signal having a frequency of a low order which is the difference between the first and second range frequencies, controlling the second range frequency so as to establish a predetermined relationship between the phase and frequency of the first comparison signal and a first reference signal; at the first point deriving a second comparison signal which is the difference between the first and second range frequencies and comparing the phases of the second comparison signal and a second reference signal having the same nominal frequency as the first reference signal.

To illustrate the invention an embodiment thereof is described hereunder with reference to the accompanying drawing which is a block schematic diagram of a system according to the invention.

In the drawing, a master station and a remote station are shown at A and B respectively.

At point A a first range frequency generator 10 provides a first range signal of suitable value e.g. 10,000 mc./s. This range signal is frequency modulated on a carrier wave of suitable frequency provided by a carrier wave generator 11. The resultant carrier modulated by the range signal is radiated by a transmitter 12 to point B and also applied as one input of a detector circuit 13 which will be referred to later.

At point B a second range frequency generator 14 provides a second range signal of suitable value e.g. 10,001 mc./s. This range signal is frequency modulated on a carrier wave of suitable frequency (different to the carrier at point A) provided by a second carrier wave generator 15. The resultant carrier modulated by the range signal is radiated by a transmitter 16 to point B and is also applied as one input of a detector circuit 17.

Still at point B the wave from point A is received by a receiver 18 and applied an another input of the detector 17. This detector 17 which may be of the linear or of the quadratic type has therefore as an output the difference frequency of the two carrier waves amplitude modulated by the difference frequency of the two range signals (1000 c.p.s. for the examples given), plus of course numerous other frequencies. This particular output from the detector 17 is selected by a filter circuit 19 and applied to an amplitude detector 20 which serves to select the difference frequency of the two range signals, i.e., 1000 c.p.s. for the examples given.

This difference frequency is the first comparison frequency and it is applied to one input of a frequency discriminator 21. A first reference oscillator 22 of high stability (of the order of 1 part in $10^6$ or better), supplies a first reference signal to another input of the discriminator 21. The frequency of the first reference signal is the same as that of the first comparison signal (1000 c.p.s). In the discriminator 21 the frequencies and phases of the first comparison signal and the first reference signal are compared so that until a predetermined relationship between the first comparison signal and the first reference signal in frequency and in phase is established a signal is applied via a control element 23 to control the phase and frequency of the second range signal. For example the predetermined relationship may be that the first comparison signal and the first reference signal are to be coincident in frequency and in phase. The first comparison signal is not returned to point A as in U.S. Patent No. 2,907,999.

At point A a receiver 24 receives the carrier modulated by the second range signal from point B and applies it to another input of the detector 13. As at point B the filter circuits 25 and the amplitude detector 26 extract a signal which is the difference frequency between the two range signals (1000 c.p.s.) and feed it, through a phase shifting device 27 to a phase discriminator 28. This difference frequency is the second comparison signal and in the discriminator 28 the phase of the second comparison signal is compared with the phase of a second reference signal provided by a second reference oscillator 29.

The second reference oscillator 29 has the same nominal frequency as the remote reference oscillator 22 and is also of high stability (of the order of 1 part in $10^6$ or more). Thus over a short period of time required to switch from one range pattern to another, no substantial change of phase takes place between the two reference oscillators. This then is the reason why it is not necessary to return the first comparison signal to point A as in U.S. Patent No. 2,907,999. Instead of comparing the phase of the second comparison signal with the phase of the first comparison signal returned from point B, the second comparison signal at point A is compared with the second reference signal as this latter signal has a substantially fixed phase relationship to the first reference signal and thus to the first comparison signal.

The difference in phase between the second comparison signal and the second reference signal is then compared by means of the phase shifter 27, the phase discriminator 28 and a zero center device 30. Since most modern methods of distance measurement utilize the difference measurements between the range patterns the two reference signals may be in any arbitrary phase relationship. It should be mentioned that the predetermined relationship which is established between the first comparison signal and the first reference signal does not change as the range frequencies are switched to different values.

In order to get a measure of the distance on one measuring pattern only it would be necessary to establish the relative phase of the two reference signals and this may be done by transmitting the first reference signal over the system without the range signals present, prior to measurement.

The invention enables one to dispense entirely with the mechanism for returning the first comparison signal to the master station. Apart from the actual saving of system components there is a considerable easing of design problems which arise from the simultaneous modulation and demodulation of the returned comparison signal through the circuits which produce the local comparison signal at the master station.

As can be seen from the drawing, the two stations are substantially identical. Thus the remote station can be changed to a master station and the master station can be changed to a remote station with only a few small changes.

I claim:

1. A method of providing a relative measure of the distance between two points including the steps of transmitting a signal of a first range frequency of a high order from the first point; transmitting a signal of a second range frequency of a similar high order from the second point; at the second point deriving a first comparison signal having a frequency of a low order which is the difference between the first and second range frequencies, controlling the second range frequency so as to estabilsh a predetermined relationship between the phase and frequency of the first comparison signal and a first reference signal; at the first point deriving a second comparison signal which is the difference between the first and second range frequencies and comparing the phases of the second comparison signal and a second reference signal having the same nominal frequency as the first reference signal.

2. A method as claimed in claim 1 in which the second range frequency signal is so controlled that the first comparison signal is made to coincide in phase and frequency with the first reference signal.

3. A method as claimed in claim 1 in which the range frequency signals are modulated on carrier waves of frequencies suitable for propagation purposes.

4. A system for providing a relative measure of the distance between two points comprising means to generate and transmit a signal of a first range frequency of a high order from the first point; means to generate and transmit a signal of a second range frequency of a similar high order from the second point; at the second point, means to receive the first range frequency signal, means to derive a first comparison signal having a frequency of a low order which is the difference between the first and second range frequencies, means to generate a first reference signal, means to control the second range frequency signal to establish a predetermined relationship between the phases and frequencies of the first comparison signal and the first reference signal; at the first point, means to receive the second range frequency signal, means to derive a second comparison signal having a frequency of a low order which is the difference between the first and second range frequencies, means to generate a second reference signal having the same nominal frequency as the first reference signal and means to compare the phases of the second comparison signal and the second reference signal.

5. A system as claimed in claim 4 in which the first reference signal is of the same order of frequency as the first comparison signal.

6. A system as claimed in claim 5 in which means to control the second range frequency signal consists in means to adjust the frequency and phase of the second range frequency signal until the first comparison signal and the first reference signal are coincident with one another in frequency and in phase.

7. A system as claimed in claim 1 in which the first and second reference signals are generated by oscillators at the two points, the stability of the oscillators being of the order of at least 1 part in $10^6$.

8. A system as claimed in claim 1 including means to generate a suitable carrier wave at each point and means, at each point to modulate the range frequency signal generated at the point on the carrier wave for transmission to the other point.

No references cited.

CHESTER L. JUSTUS, *Primary Examiner.*